United States Patent [19]
Chacon et al.

[11] Patent Number: 6,102,266
[45] Date of Patent: Aug. 15, 2000

[54] HOLSTER FOR HAND-HELD COMPUTER

[75] Inventors: Debbie A. Chacon, Seattle; Jeffrey Mark Payne, deceased, late of Bothell, both of Wash., by Joanne Payne, legal representative

[73] Assignee: Intermec IP Corporation, Woodland Hills, Calif.

[21] Appl. No.: 08/826,599

[22] Filed: Apr. 3, 1997

[51] Int. Cl.$^7$ .................................................. A45F 5/00
[52] U.S. Cl. .................. 224/679; 224/661; 224/675; 224/677; 224/930
[58] Field of Search .................... 224/661, 674, 224/675, 679, 930, 677; D3/218, 215, 226

[56] References Cited

U.S. PATENT DOCUMENTS

| | | | |
|---|---|---|---|
| D. 367,166 | 2/1996 | Hettenbach . | |
| D. 372,145 | 7/1996 | Elmer | D6/475 |
| D. 373,242 | 9/1996 | Beletsky | D3/222 |
| D. 373,243 | 9/1996 | Tovey et al. | D3/228 |
| D. 374,768 | 10/1996 | Lundie, Jr. | D3/218 |
| D. 374,770 | 10/1996 | Case | D3/229 |
| D. 374,937 | 10/1996 | Salas | D25/68 |
| 4,071,065 | 1/1978 | Halbich | 224/679 |
| 4,775,083 | 10/1988 | Burger et al. . | |
| 4,828,154 | 5/1989 | Clifton, Jr. | 224/661 |
| 4,917,281 | 4/1990 | Ostermiller . | |
| 5,358,110 | 10/1994 | Simpson | 224/930 |
| 5,537,678 | 7/1996 | King et al. | 455/348 |
| 5,540,368 | 7/1996 | Oliva | 224/271 |
| 5,544,794 | 8/1996 | Nichols | 224/667 |
| 5,547,115 | 8/1996 | Ambrosius et al. | 224/240 |
| 5,551,079 | 8/1996 | Panther et al. | 455/347 |
| 5,551,610 | 9/1996 | Clifton, Jr. | 224/197 |
| 5,551,611 | 9/1996 | Gilmore | 224/198 |
| 5,570,827 | 11/1996 | Wiesner | 224/587 |
| 5,570,830 | 11/1996 | Nichols | 224/676 |
| 5,718,104 | 2/1998 | Kennedy . | |

*Primary Examiner*—Linda J. Sholl
*Attorney, Agent, or Firm*—Perkins Coie LLP

[57] ABSTRACT

A holster assembly for a hand-held computer or other hand-held electronic device. The holster assembly has first and second holster sides connected together to define a receiving area with an open end and a substantially closed end opposite the open end. The open end is sized to allow the hand-held computer to be moved into and out of the receiving area between installed and removed positions. The first holster side is a molded, compressed foam structure having a first contoured surface shaped to substantially cover the first side portion when the hand-held computer is in the installed position. The second holster side is a molded, compressed foam structure having a second contoured surface facing the first contoured surface and being shaped to substantially cover the portion of the second side surface. A holster retaining strap is attached to the first holster side to allow the holster assembly to be retained on, as an example, the belt of a user or the like.

9 Claims, 5 Drawing Sheets

HOLSTER FOR HAND-HELD COMPUTER

TECHNICAL FIELD

The present invention is directed toward carrying devices for electronic devices, and more particularly toward portable carrying devices for hand-held electronic devices.

BACKGROUND OF THE INVENTION

Hand-held computers, symbology readers, and other electronic devices have become popular, in part, because they can be easily carried around and used to quickly collect data, such as inventory data or the like. The hand-held computers are small and compact enough to be carried by one hand and easily used with one or two hands. When the hand-held computer is not in use and the user needs the use of both hands, the hand-held device must be put down to free the user's hands. A hand-held device can be damaged if dropped, impacted, or handled too roughly when it is put down. In addition, if the user does not have a convenient and close place to store the hand-held device, the user's ability to work quickly and efficiently is reduced.

Different systems have been used to store a hand-held electronic device in a convenient and close position so as to free the user's hands. For example, a tether is used to connect the hand-held device to a user so the device can hang on the tether when not in use. One drawback to the tether system is the tether allows the hand-held device to swing when not in use and the tether does not protect the device from being hit or damaged while hanging. The tether also limits how far the hand-held device can be moved away from the user during use, so the tether limits the user's efficiency of using the hand-held device.

Another storage system includes a conventional carrying case, such as a satchel, into which the hand-held electronic device can be put when not in use. The conventional carrying case, however, is relatively bulky and is not shaped to closely conform to the shape of the hand-held device. As a result, the hand-held device is loosely contained and will slide around within the carrying case. The hand-held device may also hit against or even fall out of the case. When the hand-held device slides around within the carrying case, the device's control keys may be inadvertently pressed, and the device's surfaces may be excessively worn. As an example, indicia on the control keys can be rubbed off, thereby rendering use of the electronic device difficult.

SUMMARY OF THE INVENTION

The present invention provides a holster assembly for a hand-held electronic device that overcomes problems experienced in the prior art and provides additional benefits. The holster assembly provides a formed holster that fits the shape of the hand-held electronic device. The holster assembly of one exemplary embodiment includes first and second holster sides that are connected together to define a receiving area. The receiving area is shaped and sized to substantially conform to a portion of the electronic device when the device is installed in the holster assembly. The receiving area is also sized to allow the electronic device to be easily and quickly moved to an installed position within the holster assembly and to a removed position out of the holster assembly.

The first holster side is a molded structure having a first contoured surface The first holster side substantially covers and protects the electronic device's side portion when the electronic device is in the installed position. The second holster side is a molded structure having a second contoured surface that faces the first contoured surface. The second contoured surface is shaped to substantially cover the side portion. The first and second holster sides are contoured to allow a user to easily and quickly store the hand-held electronic device in the installed position when the device is not needed, thereby freeing the user's hands. The first and second holster sides are also shaped and sized so a user can easily and quickly remove the hand-held electronic device from the holster assembly when the hand-held electronic device is needed.

The holster assembly also has a holster retaining member attached to one of the first and second holster sides. The holster retaining member is adapted to releasably attach to a user, so the holster assembly is retained in a convenient and easily accessible location on the user, such as adjacent to the user's hip or leg.

DETAILED DESCRIPTION OF THE INVENTION

Figure 1:
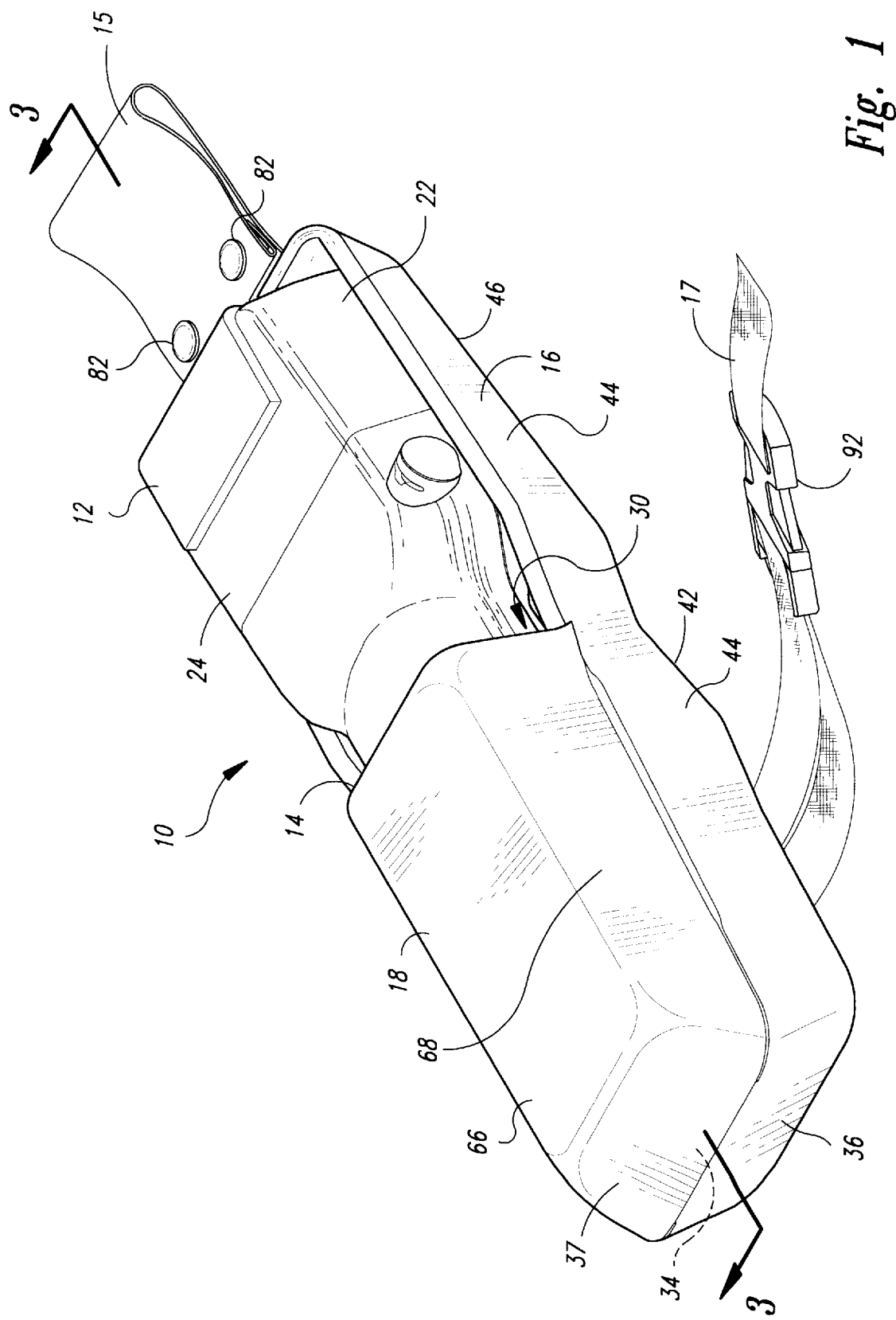
FIG. 1 is a rear isometric view of a holster assembly and a hand-held computer in accordance with an embodiment of the present invention.

A holster assembly 10 for use with a hand-held computer 12 in accordance with one embodiment of the present invention is shown in the figures for illustrative purposes. As best seen in FIG. 1, the holster assembly 10 includes a holster 14 with a molded front holster side 16 and a molded rear holster side 18 that are connected together and contoured to receive the hand-held computer 12. The front and rear holster sides 16 and 18 securely retain the hand-held computer 12 within the holster 14 when the hand-held computer is in an installed position. In the installed position, the hand-held computer 12 is protected by the holster 14 and prevented from excessive moving around within the holster assembly 10.

The holster assembly 10 includes a belt strap 15 and an optional leg strap 17 attached to the holster 14 that allow the user to wear the holster assembly in a comfortable and convenient position, so the hand-held computer 12 can be inserted into and removed from the holster. When the holster assembly 10 is worn by the user, the front holster side 16 is positioned adjacent to the user's leg or hip, and the rear holster side 18 is spaced apart from the user's leg or hip.

The holster assembly 10 of the illustrated embodiment receives and securely retains an Intermec Trakker® Antares™ hand-held scanner and computer. Although the illustrated embodiment shows a hand-held computer 12, other hand-held electronic devices, such as symbology readers, data collection units, personal digital assistants (PDA's), portable telephones, other hand-held computers and the like can be used with a holster assembly 10 that is molded to the shape of the particular hand-held electronic device.

Figure 2:
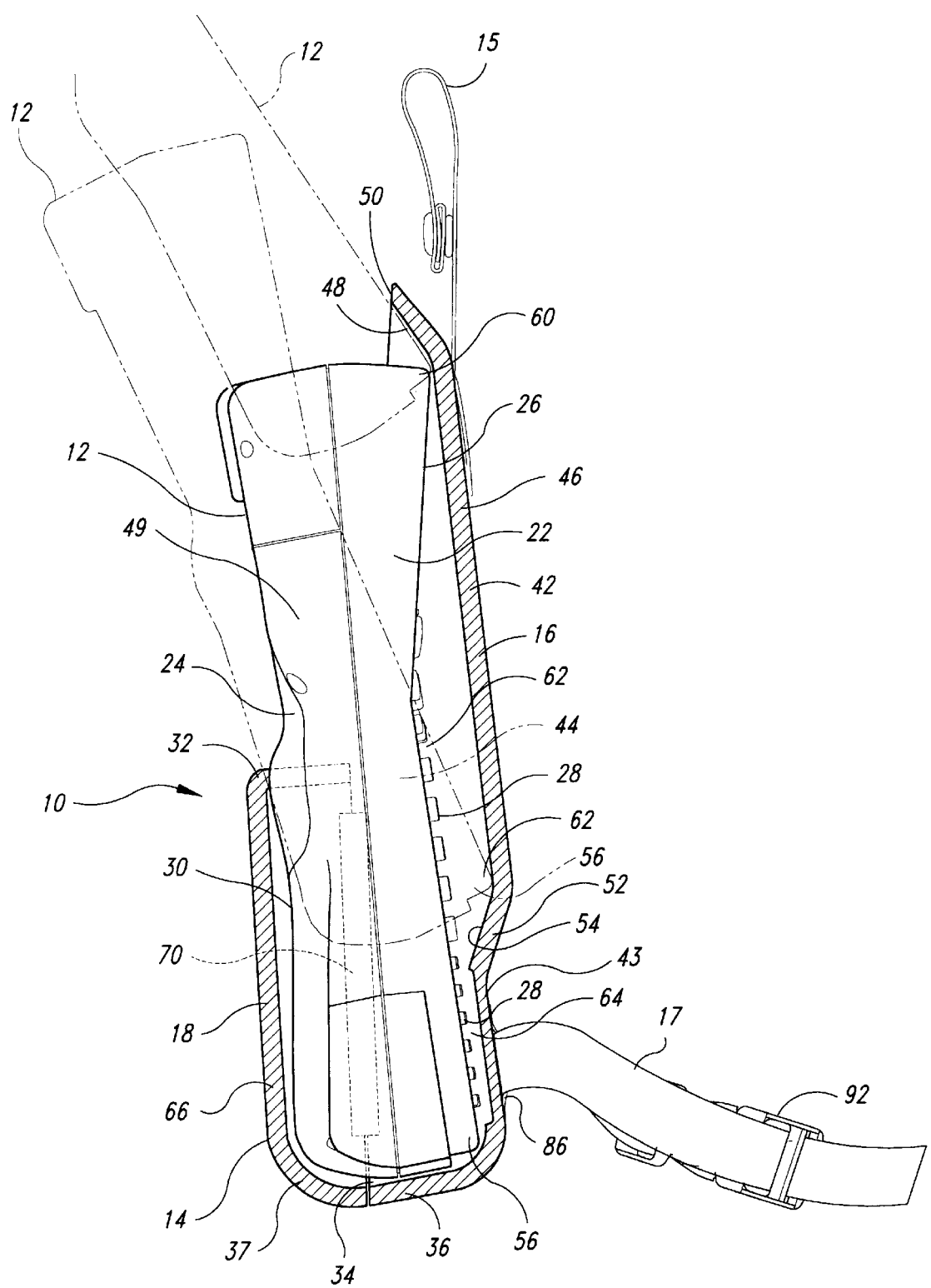
FIG. 2 is a cross-sectional view taken substantially along line 2—2 of FIG. 1.

As best seen in FIG. 2, the illustrated hand-held computer 12 includes a contoured front portion 22 that is connected to a contoured back portion 24. The contoured front portion 22 supports a data display screen 26 and a plurality of control keys 28 thereon that allow the user to manipulate and control the hand-held computer 12.

When the hand-held computer 12 is in the installed position in the holster assembly 10, as is illustrated in FIG. 2, the computer's front portion 22 faces and substantially is contained by the contoured front holster side 16. The holster 14 is shaped so approximately one-half of the computer's back portion 24 is covered and contained by the rear holster side 18, and the other half of the computer's back portion is exposed. Accordingly, the user wearing the holster assembly 10 can easily and quickly grab the hand-held computer 12 and remove it from the holster 14. The holster 14 is also shaped and sized to allow a user to easily and quickly move the hand-held computer 12 from a removed position to the installed position, thereby freeing the user's hands while the hand-held computer remains in a protected, close, and convenient location.

The front and rear holster sides 16 and 18 are connected together to define a receiving area 30 that removably contains the hand-held computer 12 therein when the computer is in the installed position. The receiving area 30 has an open top side 32 that is shaped and sized to allow the hand-held computer 12 to move into and out of the receiving area as the computer is moved between the installed and removed positions. The receiving area 30 also has a substantially closed bottom end 34 formed by interconnected endwalls 36 and 37 of the front and rear holster sides 16 and 18, respectively. Accordingly, the endwalls 36 and 37 prevent the hand-held computer 12 from dropping out the bottom of the holster 14.

Figure 3:
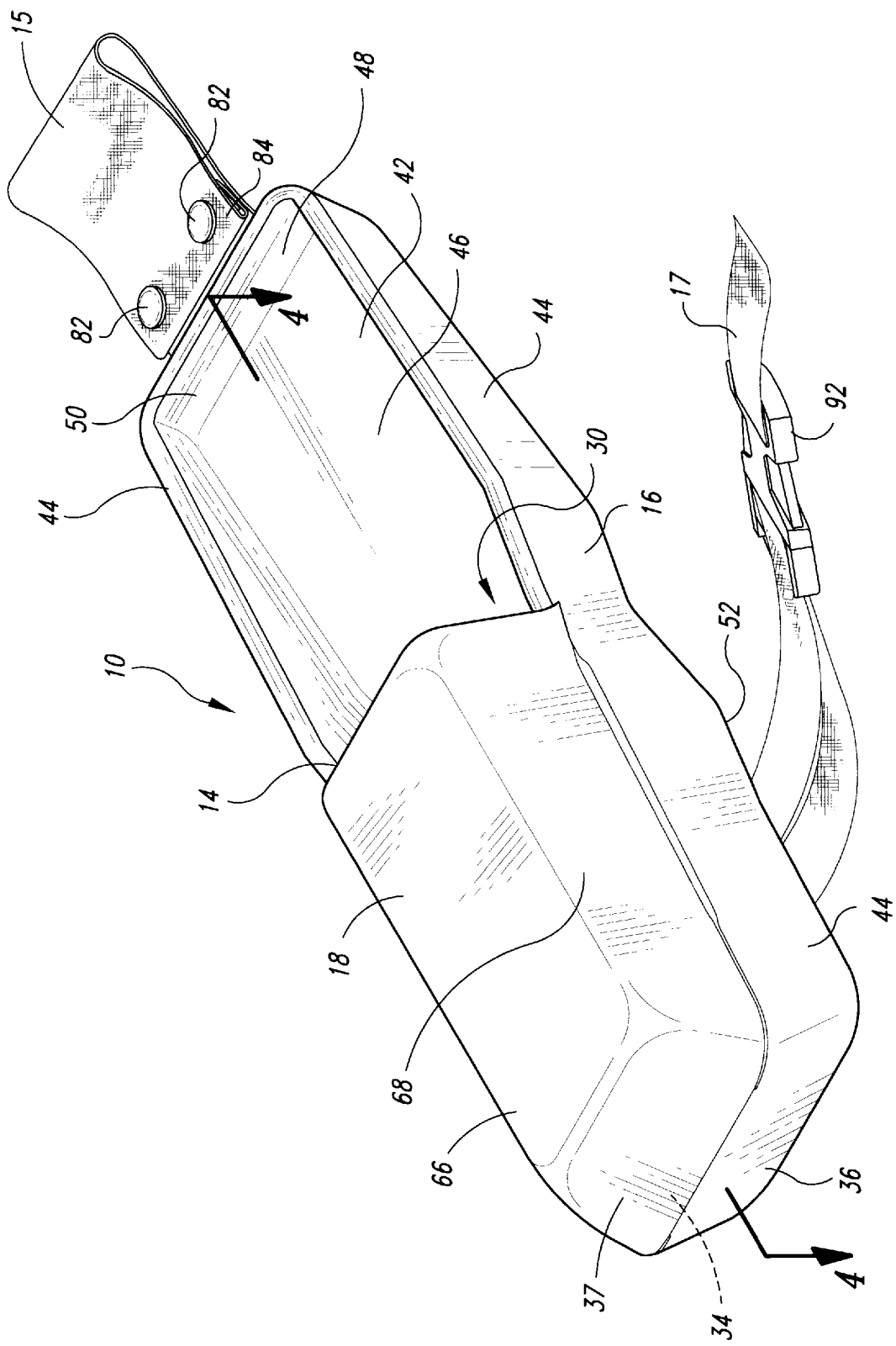
FIG. 3 is a rear isometric view of the holster assembly of FIG. 1 with the hand-held computer not shown.

As best seen in FIGS. 2 and 3, the front holster side 16 is a molded, contoured foam structure having a shape to receive the hand-held computer's front portion 22. In an exemplary embodiment, the front holster side 16 is constructed of a molded, compressed, polyethylene foam that absorbs shock and impacts, thereby protecting the hand-held computer 12 when in the installed position. The molded, compressed polyethylene foam is a substantially stiff and rigid foam that maintains its structural integrity so the holster 14 retains its shape over the life of the holster. The polyethylene foam is covered by outer layers of durable polyester material that resists wear as the hand-held computer 12 is moved into and out of the holster 14.

The front holster side 16 includes a contoured back wall 42 and a plurality of contoured sidewalls 44 integrally connected to the back wall to define a tray-like structure. The back wall 42 has an upper wall portion 46 that is positioned immediately adjacent to the hand-held computer's display screen 26 (FIG. 2) when the hand-held computer 12 is in the installed position, thereby protecting the screen from being scratched or otherwise damaged.

An upper guiding ramp 50 is integrally connected to an upper edge of the upper wall portion 46. The upper guiding ramp 50 has a sloped inner surface 48 that is oriented at a selected angle relative to a plane defined by the upper wall portion 46. The selected angle is preferably in the range of approximately 40° to 50°, inclusive. In the exemplary embodiment, the selected angle of the upper guiding ramp 50 is approximately 45° relative to the upper wall portion 46. The upper guiding ramp 50 is ergonomically shaped and positioned to engage and direct the hand-held computer 12, as shown in phantom lines in FIG. 2, toward the holster's receiving area 30 as the user moves the hand-held computer toward the installed position. When the hand-held computer 12 is moved out of the installed position toward the removed position, the upper guiding ramp 50 also directs the hand-held computer away from the upper wall portion 46 to facilitate removal of the hand-held computer.

As best seen in FIG. 2, the end portion of the front holster side 16 opposite the upper guiding ramp 50 includes a lower wall portion 43 that connects to the front holster side's endwall 36 and that extends toward the upper wall portion 46. The lower wall portion 43 is positioned in the receiving area 30 and is spaced apart from the rear holster side 18.

The lower wall portion 43 is connected to the upper wall portion 46 by a lower guiding ramp 52 extending therebetween. The lower guiding ramp 52 has an engagement surface 54 that extends at a selected angle from the upper wall portion 46 toward the rear holster side 18 and integrally connects to the lower wall portion 43. The selected angle of the lower guiding ramp 52 is in the range of approximately 10° to 20°, inclusive, relative to the plane defined by upper wall portion 46. In the exemplary embodiment, the selected angle of the lower guiding ramp 52 is approximately 15°.

The lower guiding ramp's engagement surface 54 is shaped and positioned so as to engage the hand-held computer's bottom front corner 56, as best seen in FIG. 2 in phantom lines, as the hand-held computer 12 is moved within the receiving area 30 toward the installed position. As the hand-held computer's bottom front corner 56 moves downwardly along the engagement surface 54, the lower guiding ramp 52 directs the bottom front corner and, thus, the lower portion of the hand-held computer 12 toward the rear holster side 18. This movement of the computer's lower portion toward the rear holster side 18 ensures the hand-held computer 12 does not bind against the rear holster side's upper edge 58 as the hand-held computer is inserted into the holster 14 and moved to the installed position.

The lower guiding ramp 52 is integrally formed in the front holster side 16 and provides an ergonomic shape to the holster 14 that accommodates the movements of the user to allow the user to easily and quickly insert the hand-held computer 12 into the holster 14 when the hand-held computer is not needed.

When the hand-held computer 12 is in the installed position, as shown in solid lines in FIG. 2, the upper wall portion 46 supports the upper front corner 60 of the hand-held computer 12 adjacent to the upper guiding ramp 50. The upper wall portion 46 and the lower guiding ramp 52 are spaced apart from the control keys 28 by a small gap 62. This gap 62 is such that the control keys 28 do not engage the upper wall portion 46 or the lower guiding ramp 52. Accordingly, the gap 62 substantially reduces wear on the control keys, which could result in indicia or the like on the control keys 28 being distorted or rubbed off when the hand-held computer 12 is repeatedly installed in the holster 14. The gap is sufficiently small that the hand-held computer 12 does not excessively move about within the holster 14 because of the closely conforming shape of the front and rear holster sides 16 and 18.

Figure 4:
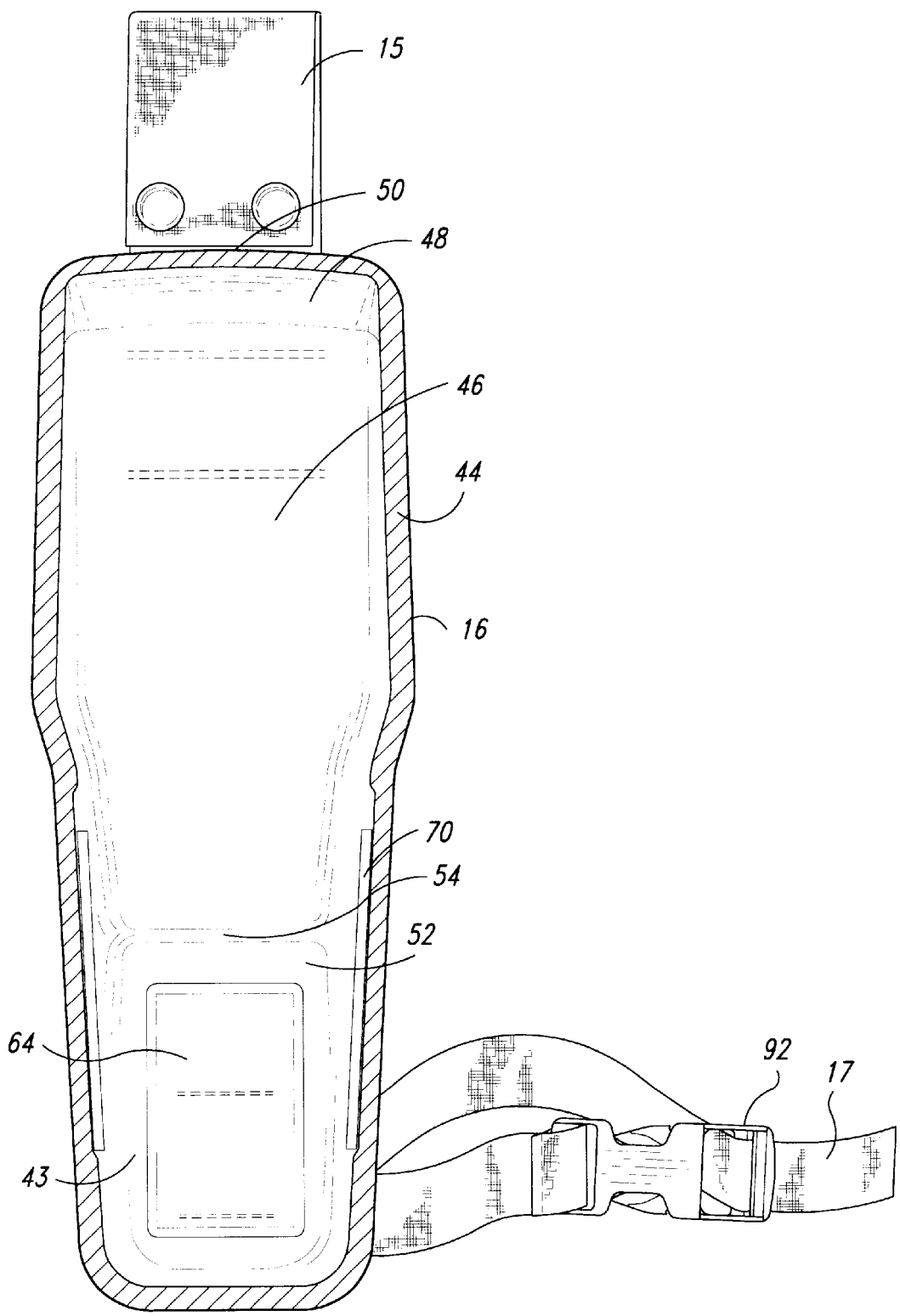
FIG. 4 is a cross-sectional view taken substantially along line 4—4 of FIG. 2 showing a recessed area in a front side of the holster assembly.

As best seen in FIGS. 2 and 4, the lower wall portion 43 of the front holster side 16 has a rectangular-shaped recessed area 64 therein that communicates with the receiving area 30 (FIG. 2) and faces the rear holster side 18 (FIG. 2). As shown in FIG. 2, the recessed area 64 is sized and positioned to receive a plurality of the control keys 28 on the hand-held computer 12 when the hand-held computer is in the installed position. When the control keys 28 are within the recessed area 64, the keys are out of direct engagement with the front holster side 16, thereby preventing excessive wear on the control keys.

As best seen in FIGS. 2 and 3, the rear holster side 18 has a rear wall 66 that is integrally connected to a plurality of sidewalls 68 and to the rear holster side's endwall 37. The rear holster side's sidewalls 68 are fixedly attached to the front holster side's sidewalls 44 by fabric strips 70 that are stitched to the sidewalls. In the exemplary embodiment, each fabric strip 70 is a nylon strip sewn onto a sidewall 44 and 68 of the front and rear holster sides 16 and 18, so two nylon strips are used to securely hold the front and rear holster sides together. In one embodiment the fabric strips 70 are elastic to allow for movement of the front holster side 16 relative to the second holster side 18 to facilitate installation and removal of the hand-held computer. Accordingly, the first and second holster sides 16 and 17 can fit very closely to the hand-held computer when the computer is in the installed position.

In the exemplary embodiment, the front and rear holster sides 16 and 18 are formed from a unitary sheet of the polyethylene foam material that is initially flat and then molded to substantially correspond to the shape of the hand-held computer 12, thereby forming the front and rear holster sides. The endwall 36 of the front holster side 16 is integrally connected to the endwall 37 of the rear holster side 18, such that the unitary sheet of foam need not be severed between the front and rear holster sides. After the unitary sheet is molded, the front holster side 16 is pivoted at the interconnection of the endwalls 36 and 37, and the fabric strips 70 are sewn to the adjacent sidewalls 44 and 68, thereby forming the holster's receiving area 30.

In an alternate embodiment, the holster 14 is formed so as to contain the hand-held computer 12 with the front side of the computer facing the rear holster side 18 and the rear side of the hand-held computer facing the front holster side 16. In the illustrated embodiment, however, the front holster side 16 is contoured to fully cover the front side portion 22 of the hand-held computer 12 to protect it from inadvertent impact or other damage while the computer is in the holster assembly 10.

In the exemplary embodiment, the molded rear holster side 18 has a length that is approximately one-half the length of the molded front holster side 16 so an upper rear portion 49 of the hand-held computer 12 is exposed when in the installed position. The exposed upper rear portion 49 is approximately 25% of the hand-held computer 12, which allows the user to easily and quickly grasp the hand-held computer and remove it from the holster 14.

Figure 5:
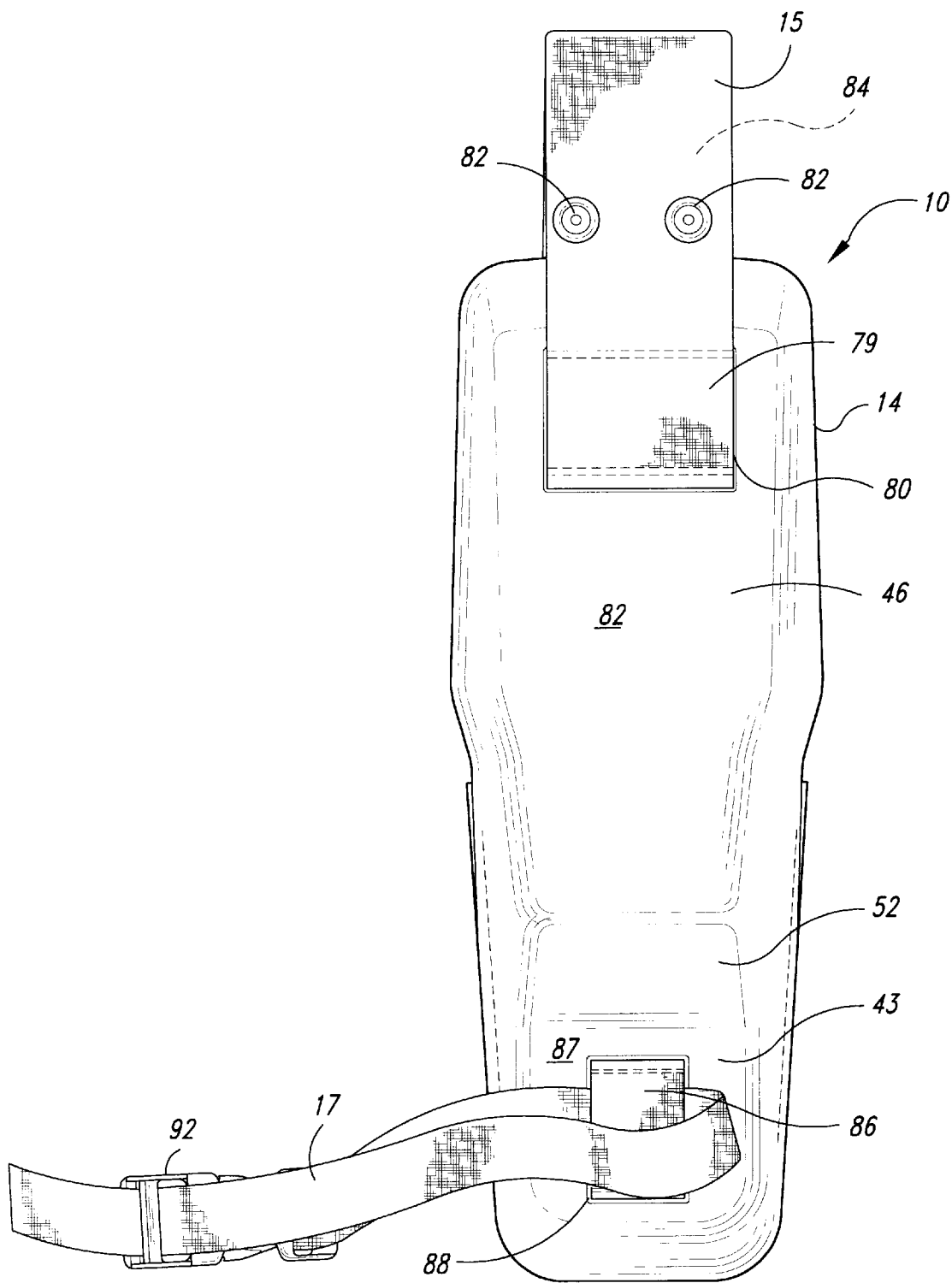
FIG. 5 is a rear elevational view of the holster assembly of FIG. 1.

As best seen in FIG. 5, the holster assembly 10 includes the belt strap 15, which is formed by a nylon strap. A bottom end portion 79 of the belt strap 15 is positioned in a recessed area 80 formed in the back surface 82 of the front holster side's upper wall portion 46. The bottom end portion 79 is securely sewn to the upper wall portion's back surface 82. The belt strap 15 includes a pair of snaps 82 that allow a top end 84 of the strap to be removably attached to a middle portion of the strap. Accordingly, the belt strap 15 is adapted to loop over and connect to, as an example, a belt of a user, with the front holster side 16 being adjacent to the user's hip or leg.

The holster assembly 10 also includes the leg strap 17 that is securely connected by a retaining strip 86 to the lower wall portion 43 of the front holster side 16. The retaining strip 86 is sewn to the rear surface 87 of the lower wall portion 43 and is positioned within a recessed area 88. The recessed area 88 is sized so the retaining strip 86 provides a minimum amount of interference with the user's leg or hip when the holster assembly 10 is being worn, thereby avoiding chafing on the user's leg or hip.

The leg strap 17 is an elongated strap with opposite end portions being releasably connected together by a conventional clasp device 92 that allows the leg strap to be quickly and easily installed around the user's leg. The leg strap 17 and clasp device 92 are adapted so the length of the leg strap is adjustable. Accordingly, the leg strap 17 can be adjusted for each user to ensure the front holster side 16 is securely held against the user's leg in a position that is comfortable and easy to access when moving the hand-held computer 12 into and out of the holster 14. In one embodiment, the leg strap 40 is an elastic strap that holds the holster 14 snuggly against the user's leg, while allowing for movement of the holster away from the leg in the event the holster is impacted.

Although specific embodiments of, and examples for, the present invention have been described above for purposes of illustration, various modifications can be made without departing from the spirit and scope of the invention, as will be evident by those skilled in the relevant art. For example, the holster assembly can be formed by other moldable material such as durable plastic or the like and molded to conform to a shape of a selected hand-held electronic device. The teachings provided herein of the present invention can be applied to other hand-held electronic devices, not necessarily limited to hand-held computers.

In general, in the following claims, the terms used should not be construed to limit the invention to the specific embodiments disclosed in the specification and claims, but should be construed to include all holster assemblies and holster and hand-held electronic device combinations in accordance with the claims. Accordingly, the invention is not limited by the disclosure, but instead its scope is to be determined entirely from the following claims.

We claim:

1. A holster assembly for a hand-held electronic device, the hand-held electronic device having contoured first and second side surfaces, comprising:

first and second holster sides integrally connected together to define a holster shape and a receiving area for receiving the hand-held electronic device therein, the receiving area having an open end sized to allow the hand-held electronic device to be moved into and out of the receiving area through the open end between the installed position and a removed position, the first holster side being a substantially stiff, molded, compressed foam structure having a first contoured surface shaped to substantially cover the portion of the first side surface when the hand-held electronic device is in the installed position, and the second holster side being a substantially stiff, molded, compressed foam structure having a second contoured surface facing the first contoured surface and being shaped to substantially cover the portion of the second side surface, the first and second holster sides having a stiffness and structural integrity so the first and second holster sides maintain the holster shape during use of the holster assembly, wherein the first holster side has a first panel portion that is spaced apart from the second holster side and that has a first edge portion spaced away from the open end of the receiving area, the first holster side has a guiding ramp that is connected to the first edge portion and that extends away from the first edge portion at a selected angle relative to a plane defined by the first panel portion, the guiding ramp being positioned to guide the hand-held electronic device into and out of the receiving area as the hand-held electronic device is moved between the installed and removed positions, the first holster side has a back wall panel spaced apart from the second holster side, the first holster side having a guiding ramp that is connected to the back wall panel and that defines a portion of the receiving area, the guiding ramp extends away from the back wall panel toward the second holster side at a selected angle relative to a plane defined by the back wall panel, the guiding ramp being shaped and positioned to engage a bottom portion of the hand-held electronic device and move the bottom portion of the hand-held electronic device toward the second holster side when the hand-held electronic device is moved from the removed position toward the installed position; and a holster retaining member attached to one of the first and second holster sides.

2. The holster assembly of claim 1 wherein the first contoured surface of the first holster side is shaped to substantially cover all of the first side surface when the hand-held electronic device is in the installed position.

3. The holster assembly of claim 1 with the hand-held electronic device having control keys on the first side surface, and wherein the first holster side has a recessed portion positioned to receive the control keys therein, the recessed portion having a depth selected so the control keys are out of engagement with the first holster side when the hand-held electronic device is in the installed position.

4. The holster assembly of claim 1 with the hand-held electronic device having control keys on the first side surface, wherein the first holster side has a back wall portion and sidewall portions extending away from the back wall portion toward the second holster side, the back wall portion having a recessed portion therein facing the second holster side, the recessed portion being positioned and sized to receive the control keys of the hand-held electronic device therein when the hand-held electronic device is in the installed position so the first holster side is out of engagement with the control keys.

5. The holster assembly of claim 1 wherein the selected angle of the guiding ramp being in the range of approximately 40° to 50°, inclusive.

6. The holster assembly of claim 1 wherein each of the first and second holster sides are molded foam structures with a polyethylene foam core and a fabric material covering surrounding the polyethylene foam core.

7. The holster assembly of claim 1 wherein the holster retaining member is a strap that is removably connectable to a user to retain the holster assembly in a selected position relative to the user.

8. The holster assembly of claim 1 wherein the first and second holster sides are integrally connected together and formed from a unitary molded structure.

9. A holster assembly for a hand-held electronic device, the hand-held electronic device having contoured first and second side surfaces, comprising:

first and second holster sides integrally connected together to define a holster shape and a receiving area for receiving the hand-held electronic device therein, the receiving area having an open end sized to allow the hand-held electronic device to be moved into and out of the receiving area through the open end between the installed position and a removed position, the first holster side being a substantially stiff, molded, compressed foam structure having a first contoured surface shaped to substantially correspond to a shape of a portion of the first side surface and to substantially cover the portion of the first side surface when the hand-held electronic device is in the installed position, and the second holster side being a substantially stiff, molded, compressed foam structure having a second contoured surface facing the first contoured surface and being shaped to substantially cover the portion of the second side surface, the first and second holster sides having a stiffness and structural integrity so the first and second holster sides maintain the holster shape during use of the holster assembly wherein the first holster side has a first panel portion that is spaced apart from the second holster side and that has a first edge portion spaced away from the open end of the receiving area, the first holster side has a guiding ramp that is connected to the first edge portion and that extends away from the first edge portion at a selected angle relative to a plane defined by the first panel portion, the guiding ramp being positioned to guide the hand-held electronic device into and out of the receiving area as the hand-held electronic device is moved between the installed and removed positions, the first holster side has a back wall panel spaced apart from the second holster side, the first holster side having a guiding ramp that is connected to the back wall panel and that defines a portion of the receiving area, the guiding ramp extends away from the back wall panel toward the second holster side at a selected angle relative to a plane defined by the back wall panel, the guiding ramp being shaped and positioned to engage a bottom portion of the hand-held electronic device and move the bottom portion of the hand-held electronic device toward the second holster side when the hand-held electronic device is moved from the removed position toward the installed position, the selected angle of the guiding ramp being in the range of approximately 10° to 20°, inclusive; and a holster retaining member attached to one of the first and second holster sides.

\* \* \* \* \*